Dec. 5, 1944.  A. W. OEHLER  2,364,311
COMBINE
Filed April 13, 1942
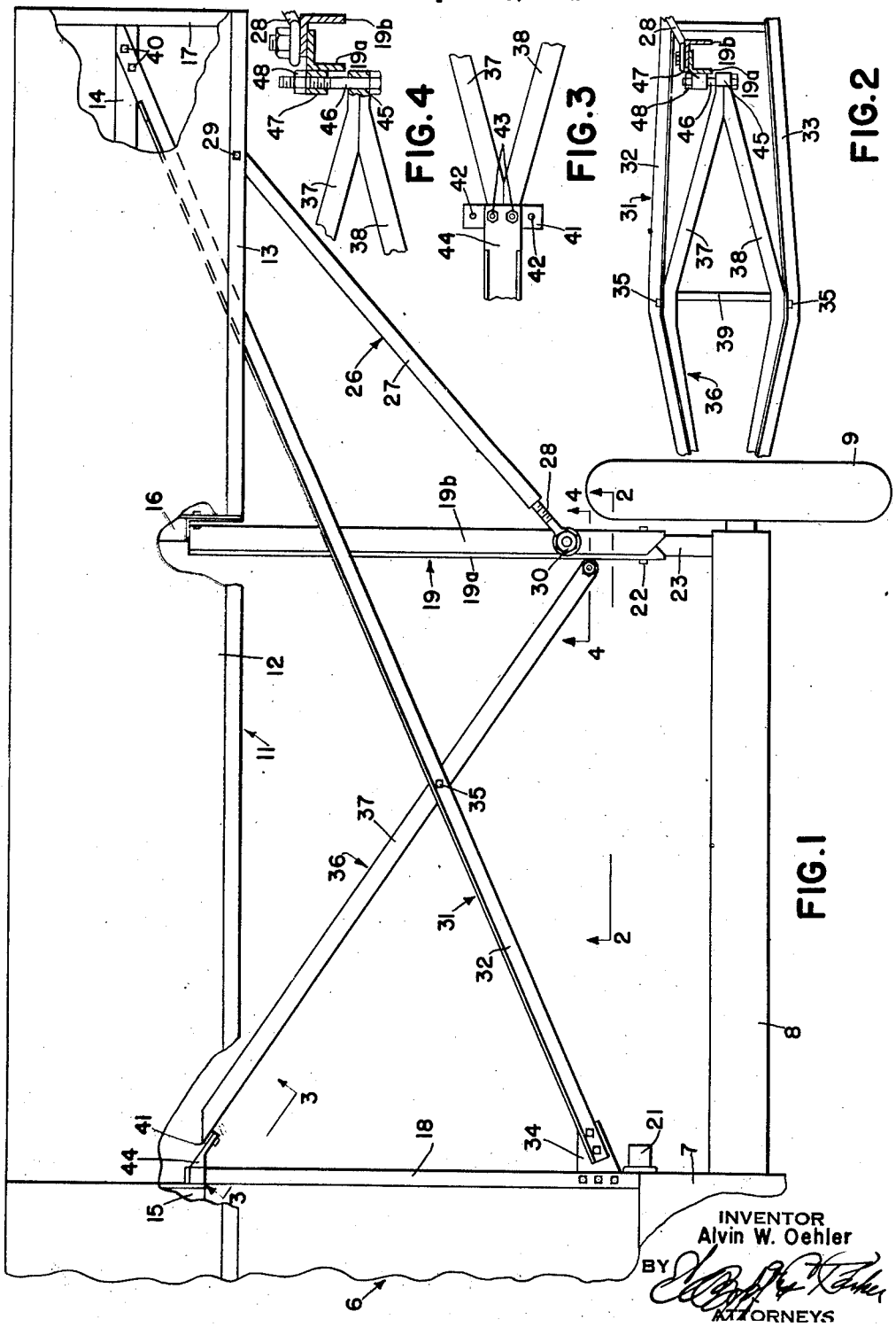
INVENTOR
Alvin W. Oehler
BY
ATTORNEYS Patented Dec. 5, 1944

2,364,311

UNITED STATES PATENT OFFICE 2,364,311

COMBINE

Alvin W. Oehler, Moline, Ill. assignor to Deere & Company, Moline, Ill., a corporation of Illinois Application April 13, 1942, Serial No. 438,861

8 Claims. (Cl. 56—122)

The present invention relates to combined harvesting and threshing machines of the type having a longitudinal main frame supporting the threshing mechanism and a laterally extending secondary frame upon which the harvesting mechanism is supported.

The principal object of the invention is to provide an implement of this nature wherein the secondary frame is suspended from the main frame and braced with crossed truss members and having adjusting means to raise one truss member to level the outer end of the secondary frame.

Other objects and advantages of the present invention will become apparent to those skilled in the art after a consideration of the following detailed description of the preferred embodiment thereof, reference being had to the accompanying drawing, in which Figure 1 is a fragmentary plan view of a combined harvester and thresher, showing the parts affected by my invention;

Figure 2 is a detail view, partly in cross section, taken substantially in the plane of line 2—2 of Figure 1;

Figure 3 is a detail view of the front end of one of the truss members, taken on the line 3—3 of Figure 1 and showing the means by which it is adjustably attached to a supporting arm; and Figure 4 is a cross-sectional view, taken on the line 4—4 of Figure 1, showing the means for suspending the rear end of the aforementioned truss member and for adjusting it to raise and lower the other truss member.

Referring now to the drawing, the thresher part, represented by the numeral 6, is disposed longitudinally of the implement and is mounted on a main frame 7 having a transverse supporting beam 8 extending laterally therefrom, and supported on transversely spaced wheels, one of which is shown at 9.

The harvesting unit 11 comprises a secondary frame platform 12, which includes transverse frame bars 13 and 14 connected by cross bars 15, 16 and 17. The platform 12 is supported on a pair of spaced arms 18 and 19 which are fixed, at their forward ends, to bars 15 and 16, respectively, and extend rearwardly to axially aligned pivotal connections 21 and 22 of the main frame of the implement. The arm 18 is formed of an angle iron member arranged with one web in a vertical plane and the other web in a horizontal plane. The arm 19 includes two angle iron members 19a and 19b arranged in overlapping relation and welded or otherwise secured together and forming, in effect, an inverted channel member, and is pivotally supported by the bolt 22 on an angle iron bracket 23, which is rigidly mounted on the frame member 8 adjacent the wheel 9.

The platform 12 extends outwardly laterally beyond the arm 19 and is braced against rearward thrust by a brace 26 disposed between the arm 19 and the frame member 13. The brace 26 is longitudinally adjustable and comprises a tubular member 27 which is threaded internally at one end to receive an eyebolt 28. The front end of the brace 26 is connected to the frame member 13 by a bolt 29, and a bolt 30 extends through the eye in eyebolt 28 and through an opening provided in the arm 19 slightly forward of the pivot 22. The threaded connection of the eyebolt 28 with the member 27 permits adjusting the brace 26 to the proper length to hold the platform 12 forwardly to the desired working position. It is also necessary that the platform 12 be maintained in a level horizontal position so that the cutting mechanism mounted along the front edge of the platform (not shown in the drawing) will cut the full swath of material at a uniform height. To accomplish this a truss member 31 is provided between the outer end of the platform and the arm 18. The truss member 31 includes an upper arch bar 32 and a lower arch bar 33. The front ends of the bars 32 and 33 converge and are rigidly secured to the frame bar 14 of the platform 12 by bolts 40. The truss 31 extends diagonally rearwardly and the rear ends converge to a rigid connnection with a plate 34 which is fixed on the arm 18 adjacent the pivot 21. A truss member 36 is arranged at an acute angle to the truss member 31 and extends through the arched center thereof. Bolts 35 extend through corresponding upper and lower members of the trusses, serving to hold the trusses in rigid relation. The member 36 comprises an upper bar 37 and a lower bar 38. A vertical spacer 39 is provided in the central arched portion of the truss 36. The forward ends of bars 37 and 38 converge and are secured to a vertical plate 41. The plate 41 is provided with a plurality of uniformly spaced holes 42, which are adapted to selectively receive bolts 43 provided in a bracket 44 secured on the front end of arm 18. The rear end of bars 37 and 38 converge and are welded together and to a vertically disposed sleeve 45 (see Figures 2 and 4). The sleeve 45 receives a bolt 46 which extends upwardly through another sleeve 47 fixed on the side of member 19a. An adjusting nut 48 is provided on the upper end of the bolt 46 to hold the bolt in the desired position of adjustment.

To level the platform 12, the truss member 36 is raised or lowered by turning nut 48 in one direction or the other. The truss member 36 acts, in effect, as a lever to raise or lower the truss member 31 which raises and lowers the outer end of the platform 12, transferring the weight thereof to the arms 18, 19. If sufficient adjustment to level the platform is not obtained through the range of adjustment furnished by the bolt 46 and nut 48, additional adjustment can be obtained at the front end of the truss 36 by shifting the plate 41 vertically with bolts 43 removed, and replacing the latter through others of the holes 42 in the plate 41.

It will be evident from the foregoing description that the truss members employed, form a rigid support for the platform and also provide means whereby the platform may be easily and quickly adjusted to bring it into a level horizontal position.

What I claim is:

1. In a machine of the character described, a main frame, a secondary frame, arms fixed to said secondary frame, and pivotally connected with the main frame, rigidly connected crossed trusses having their ends connected with the arms and with said secondary frame, and an adjusting means between one end of one truss member and one of said arms for adjusting the vertical position of said one end relative to said one arm to raise and lower the other truss relative to the ground to effect leveling of the secondary frame.

2. In a machine of the character described, a main frame, a harvesting platform, a pair of horizontally spaced arms connected at their front ends to said platform, the first arm being connected adjacent the inner end of said platform, the second arm being connected between the ends of the platform, said arms being pivotally connected at their rear ends to said main frame for vertical swinging whereby said platform may be raised and lowered relative to said main frame by vertically swinging said arms, a pair of crossed truss members, the first of said members being connected at its rear end to said first arm adjacent the rear end of the latter and at its front end to the outer end of said platform, the second member being connected at its front end to said first arm adjacent the front end of the latter, and means connecting the rear end of said second member to said second arm adjacent the rear end of the latter, said means including means for adjusting the vertical portion of said second member relative to said second arm to raise and lower the other truss bodily, to level the outer end of the platform.

3. In a machine of the character described, a main frame, a secondary frame pivotally mounted on said main frame on two spaced pivots, a rigid truss member connected at its inner end to said secondary frame adjacent one of said pivots and at its opposite end to the opposite end of said secondary frame, and means reacting against said secondary frame adjacent the other pivot and acting against said truss to raise and lower said opposite end of said secondary frame.

4. In a machine of the character described, a main frame, a secondary frame, a pair of arms fixed to said secondary frame and pivotally connected with said main frame, a pair of crossed trusses, one of said truss members disposed diagonally of the machine and connected at its inner end with the main frame and at its outer end with the secondary frame, the other truss member disposed diagonally of the machine and secured to said arms, either end of said other truss member being adjustable to raise or lower the first truss member.

5. In a machine of the character described, a main frame, a secondary frame, a pair of truss members supporting the outer end of said secondary frame, and means for adjusting both ends of one truss member selectively so as to raise and lower one end of the other truss member to raise and lower the outer end of said secondary frame.

6. In a machine of the character described, a main frame, a secondary frame, a pair of arms fixed to said secondary frame and pivotally connected with said main frame, a pair of interconnected crossed trusses, one of said trusses disposed diagonally of the machine and connected at its inner end with the main frame and at its outer end with the secondary frame, the other truss disposed diagonally oppositely of the machine and fixed at its front end to one of said arms and suspendingly secured at its rear end to the other arm, and means for adjusting said rear end of said last named truss so as to raise and lower one end of the other truss to raise and lower the outer end of said secondary frame.

7. In a machine of the character described, a main frame, a secondary frame, a pair of arms fixed to said secondary frame and pivotally connected with said main frame, a rigid truss member supporting the outer end of said secondary frame, and a lever rigidly secured at one end to one of said arms and adjustable vertically relative thereto, the other end of said lever being suspendingly supported on the other arm and adjustable vertically relative to the latter, said truss member having its intermediate portion carried on the intermediate portion of said lever.

8. In a machine of the character described, a main frame, a secondary frame, a pair of arms fixed to said secondary frame and pivotally connected with said main frame, a pair of interconnected crossed trusses, one of said trusses disposed diagonally of the machine and connected at its inner end with the main frame and at its outer end with the secondary frame, the other truss disposed diagonally oppositely of the machine and mounted at its front end on one of said arms and suspendingly secured at its rear end to the other arm, and means for vertically adjusting said rear end of said last named truss so as to raise and lower one end of the other truss to raise and lower the outer end of said secondary frame, the front end of said last named truss also being vertically adjustable relative to the associated arm to change the range of adjustment effected by adjusting the rear end thereof.

ALVIN W. OEHLER.